United States Patent Office 2,927,002
Patented Mar. 1, 1960

2,927,002

PROCESS FOR THE MANUFACTURE OF HYDROGEN PEROXIDE

Charles William Le Feuvre, Luton, England, assignor to La Porte Chemicals Limited, Luton, England, a British company No Drawing. Application October 11, 1955
Serial No. 539,935

Claims priority, application Great Britain
February 23, 1951

10 Claims. (Cl. 23—207)

This invention relates to an improved process for the manufacture of hydrogen peroxide and is a continuation-in-part of my abandoned applications Serial Nos. 270,517, filed February 7, 1952, and 435,610, filed June 9, 1954.

United Kingdom specification No. 465,070 describes a process for the production of hydrogen peroxide by hydrogenating a solution of a substituted anthraquinone by means of hydrogen in the presence of a catalyst, to form the corresponding anthraquinol or anthraquinhydrone, which is then oxidised by means of oxygen to reform the anthraquinone, with simultaneous production of hydrogen peroxide, which is then separated. The process is thus cyclic. This specification gives as examples of suitable solvents for the anthraquinols, amyl alcohol, cyclohexanol and methyl-cyclohexanol, while the solvent specified for the anthraquinone is benzene, toluene, xylene or tetrahydronaphthalene. Various other solvents have subsequently been proposed for use in such a process. Thus, in United Kingdom specification No. 508,081 the solvent specified in the example is a mixture of benzene and methyl-cyclohexanol.

United Kingdom specification No. 669,274 describes the use of a solvent mixture consisting of a hydrocarbon constituent for solution of the quinone material and a water-insoluble organic phosphonate for dissolving the anthraquinol. Examples of hydrocarbons given are benzene and dimethylnaphthalene.

United Kingdom specification No. 671,254 describes a solvent mixture with the usual hydrocarbon constituent for the quinone form, while the solvent for the quinol form of the alkylated anthraquinone is a tri-substituted organic ester of phosphoric acid. Examples of hydrocarbons given are benzene and dimethylnaphthalene.

In U.S. Patent No. 2,215,883 suitable solvent mixtures are, for example, benzene and cyclohexanol, toluene and amyl alcohol, xylene or anisol and isoheptyl alcohol and anisol and methyl-cyclohexanol.

U.S. Patent No. 2,455,238, however, describes a single solvent having the requisite solvent power for the quinone as well as the quinol form and in which both reduction and oxidation can be carried out at relatively high concentrations of both forms of the working intermediate. Examples of such single solvents are esters of sebacic acid or the esters of other dibasic organic acids, such as succinic and adipic acid, the molecular structure of the ester containing twelve to sixteen carbon atoms, containing two ester groups and being made from an aliphatic or aryl-aliphatic acid and an aliphatic or aryl-aliphatic alcohol. The specification mentions a number of esters including di-p-methyl-cyclohexyl succinate.

United Kingdom specification No. 686,567 describes a solvent mixture consisting of the primary and secondary nonyl alcohols and mixtures thereof and a substance selected from the group consisting of the mono-methyl and di-methyl substituted naphthalenes and mixtures thereof.

The component for dissolving the anthraquinhydrone or anthraquinol can also influence the ease of aqueous extraction of the hydrogen peroxide produced when the other component in the solvent mixture is an aromatic hydrocarbon, e.g. benzene, as the partition coefficient of hydrogen peroxide between the water and the solvent mixture depends largely upon it. The solvents previously proposed, and illustrated above, for dissolving the anthraquinhydrone or anthraquinol had, however, several disadvantages. Thus, cyclohexanol is a good solvent for the anthraquinhydrone or anthraquinol, but it is very soluble in water and is oxidised to adipic acid by hydrogen peroxide. Both amyl alcohol and methyl-cyclohexanol have an inconveniently high solubility in water. The partition coefficients also of the mixtures of cyclohexanol, methyl cyclohexanol and amyl alcohol with the solvent for the anthraquinones are low. The determination of partition coefficients is described in Example 2.

The present invention is based upon the discovery that the acetates and propionates of cyclohexanol and of alkyl cyclohexanols, particularly methyl cyclohexanol and preferably methyl cyclohexanol acetates are excellent solvents for the process either when used alone or as components of solvent mixtures. Preferably the alkyl group or groups in the alkyl cyclohexanols do not contain more than eight carbon atoms.

The term "alkyl cyclohexanol" as used herein includes not only the separate isomers but also a mixture of any or all of the isomers.

Accordingly, the present invention in its broadest aspect provides in a cyclic process for the manufacture of hydrogen peroxide by the autoxidation of an anthraquinone derivative selected from the group consisting of substituted anthraquinhydrones and substituted anthraquinols in a solvent to form hydrogen peroxide and a substituted anthraquinone with the subsequent removal of the hydrogen peroxide by extraction with an aqueous liquid followed by reduction of the substituted anthraquinone back to said substituted anthraquinhydrone or substituted anthraquinol which is again autoxidised, the step of using a single solvent or a solvent mixture containing an aliphatic ester selected from the group consisting of acetates and propionates of cyclohexanol and of alkyl cyclohexanols, but the scope of this invention includes both types of solvent.

The use of a single solvent as distinct from a solvent mixture has a number of advantages as follows:

(1) It is simpler to use a single solvent than a mixture of solvents. It obviates the trouble of maintaining the proportion of the two solvents in a solvent mixture.

(2) It obviates the use of benzene and similar solvents with a low flash point, as the cyclohexanol esters have a higher flash point.

(3) Owing to the higher solubility of the quinol form in a single solvent, a greater quinol concentration can be used, and hence there is less solution to handle than when using a solvent mixture, for the same hydrogen peroxide output.

Examples of esters suitable for use in the process of the present invention are the acetic acid or propionic acid etsers of cyclohexanol or of methyl cyclohexanol (in this latter case the 1, 2, or 3 isomers or a mixture of them).

If a solvent mixture is used the solvent for the quinone may be benzene. Benzene, usually employed as the solvent for the quinone has, however, the serious disadvantage of having a low flash point and high vapour pressure. In addition benzene vapour is highly toxic so that not only are there fire risks, but also possible health hazards for the plant operators. In a process in which gases are blown through a mixture containing benzene and then to waste, its low vapour pressure necessitates an expensive solvent recovery process. It is therefore proposed to employ as the solvent for the quinone one or more benzenes containing one or more alkyl groups, e.g. ethyl or methyl substituted benzenes.

In addition to having a higher flash point, the benzenes containing one or more alkyl groups, e.g. ethyl or methyl substituted benzenes, also have other advantages. With increasing substitution the vapour pressure and toxicity decrease. Thus, by a suitable choice of solvent, fire and other hazards can be greatly decreased, while the necessity for solvent recovery processes can be largely eliminated. Another advantage is that the control of solvent proportions is simplified as this can be difficult when one of the components of the solvent mixture is more volatile than the other, which is generally true with benzene.

The alkyl substituted benzenes may be, for example, one or more xylenes or one or more trimethyl-benzenes. An example of a suitable methyl substituted benzene is a proprietary solvent derived from petroleum and having a boiling range of 5% at 155° C. and 95% at 185° C. The proportion of aromatic compounds to paraffinic in this solvent is of the order 4:1. It contains 50% of mesitylene (1:3:5-trimethyl-benzene), 30% of pseudocumene (1:2:4-trimethyl-benzene) and 1:3:4-trimethylbenzene. The remaining 20% are paraffinic compounds. The above solvent has a flash point of 105° F. and a specific gravity of 0.855; another similar solvent has a flash point of 125° F. and a specific gravity of 0.870. Another example is a mixture of xylene isomers, obtained from a petroleum source, which has a specific gravity of about 0.855, with a flash point of 75° F.

Furthermore, other commercial alkyl substituted benzenes may be used and if desired may be purified by conventional methods before use in the process of the present invention.

The use of an acetate or propionate of cyclohexanol or of an alkyl cyclohexanol results in a number of advantages as compared with the customary solvents such as cyclohexanol and amyl alcohol. Thus, the acetates and propionates of cyclohexanol and alkyl cyclohexanols have a lower water solubility and they are more resistant to oxidation. Although the solubility of the anthraquinhydrone or anthraquinol in them is less than in the corresponding cyclohexanol, the hydrogen peroxide is more easily extracted as they have a higher partition coefficient.

Furthermore, the acetates and propionates of cyclohexanol and of alkyl cyclohexanols have advantages over the solvents of U.S. Patent No. 2,455,238 as is shown by the following experiments comparing the di-methylcyclohexanol succinate and methylcyclohexanol acetate.

A solution of 60 gm. of 2-ethyl anthraquinone in one litre of methylcyclohexanol acetate was made and its density at 20° C. was found to be 0.959 gm./cc. A solution of 60 gm. of 2-ethyl anthraquinone in one litre of di-methylcyclohexanol succinate was made and its density at 20° C. was found to be 1.038 gm./cc. These results showed that the di-methylcyclohexanol succinate would be unsuitable as a single solvent because the density of the solution would make it inconvenient for water extraction of the hydrogen peroxide.

The viscosity of the solvent or solvent mixture is of considerable importance because a high viscosity leads to a slower rate of hydrogenation, slower filtration, greater difficulty in pumping, etc. The viscosity of methylcyclohexanol acetate is 2.19 centipoises at 20° C. whilst the viscosity of di-methylcyclohexanol succinate is 70.1 centipoises at 20° C.

Comparative experiments were carried out in which, for the solvent mixture, a solution was taken containing 90 gm./litre of 2-ethyl anthraquinone in a 50:50 xylene-ester solution and hydrogenated using 1 gm. of 2% palladium on alumina catalyst in 100 cc. of the solution. The hydrogen uptake in the case in which the ester was methylcyclohexanol acetate was 27 cc. of hydrogen per minute, whilst in the case in which the ester was di-methylcyclohexanol succinate it was 11 cc. of hydrogen per minute.

The solubility of the reduced form of the quinone in solvent mixtures, each containing one of the two esters, is also of importance. Determinations of these were made in the following way: The solubility of the 2-ethyl anthraquinhydrone was determined by hydrogenating a solution of the quinone in the solvent mixture with a suitable hydrogenation catalyst until precipitation of the quinhydrone occurred. The solution was then filtered and shaken with oxygen until the dissolved quinhydrone was oxidised. The concentration of hydrogen peroxide in the oxidised solution was then determined: this was equivalent to the quinhydrone concentration, or to the quinhydrone solubility. The results were obtained using a 50:50 xylene-ester solvent mixture at 20° C. and the results for the quinhydrone solubility expressed as equivalent gm./litre of hydrogen peroxide are as follows:

Gm./litre
For methylcyclohexanol acetate _____ 2.8
For di-methylcyclohexanol succinate _____ 1.9

Thus, clearly the solubility of the quinhydrone is less in the mixture containing the succinate than in the mixture containing the acetate.

A further and most important factor favouring the methylcyclohexanol acetate is that it is available at a reasonable price commercially, whereas the di-methylcyclohexanol succinate is not available commercially, and if it were it would be likely to be of higher price than the acetate.

The following examples illustrate the invention and the advantages thereof:

EXAMPLE 1

A 10% w./v. solution of 2-ethyl anthraquinone in a mixture of equal volumes of benzene and 96% methyl cyclohexanol acetate was made. This solution was hydrogenated with hydrogen in the presence of a nickel catalyst at 20° C. for two hours so that 46% of the 2-ethyl anthraquinone was reduced to the 2-ethyl anthroquinhydrone. After separation from the catalyst, the quinhydrone solution was autoxidised by blowing air through it, reforming the quinone with simultaneous formation of hydrogen peroxide. The hydrogen peroxide was extracted from the solution by passing it through a conventional plate column counter-current to a stream of water. The recovery of hydrogen peroxide was 99% and the concentration in the extract was 162 gm. per litre of hydrogen peroxide.

It will be seen that the use of such a solvent mixture can give a high concentration of hydrogen peroxide in the aqueous extract with a high percentage of recovery of hydrogen peroxide.

The suitability of a solvent for use in the process of the present invention may be measured by determining the concentration of anthroquinhydrone or its derivative in a saturated solution, and the maximum concentration of hydrogen peroxide in aqueous solution which may be extracted with water from the organic solution after the anthraquinhydrone has been autoxidised to the anthraquinone with simultaneous formation of hydrogen peroxide. Determinations of these were made in the following way: The solubility of the 2-ethyl anthraquinhydrone was determined by hydrogenating a solution of the quinone in the solvent mixture with a suitable hydrogenation catalyst until precipitation of the quinhydrone occurred. The solution was then filtered and shaken with oxygen until the dissolved quinhydrone was oxidised. The concentration of hydrogen peroxide in the oxidised solution was then determined; this was equivalent to the quinhydrone concentration, or to the quinhydrone solubility.

The following results have been obtained under the conditions of the example given above, using 2-ethyl anthraquinhydrone as the autoxidisable agent, dissolved in a mixture of equal volumes of the ester and of benzene at 20° C. the former acting as a solvent for the 2-ethyl anthraquinhydrone, and containing some of the 2-ethyl anthraquinone.

*Composition of solutions initially containing 100 gm./ litre of 2-ethyl anthraquinone, which were reduced until they were just saturated with the quinhydrone*

| Ester | Ester content of ester component, percent | Concentration of 2-ethyl anthraquinone per litre, grams | Concentration of 2-ethyl anthraquinhydrone per litre, grams | Maximum $H_2O_2$ concentration extracted (grams per litre) |
|---|---|---|---|---|
| Cyclohexanol acetate | 98 | 41.5 | 58.5 | 180 |
| Cyclohexanol propionate | 99 | 58.0 | 42.0 | 290 |
| 96% methyl cyclohexanol acetate | 97 | 54.0 | 46.0 | 345 |

The properties of the solvent mixture may be varied within limits by altering the proportions of ester and benzene, thus altering the maximum concentrations of the anthraquinone and the anthraquinhydrone which can be used, and also the maximum extractable hydrogen peroxide concentrations. This is illustrated by the following results:

*As above, but initially containing 100 gm./litre of 2-ethyl anthraquinone or, where the solubility was below this value, saturated with 2-ethyl anthraquinone*

| Ester | Percent of ester in mixture by volume | Concentration of 2-ethyl anthraquinone per litre, grams | Concentration of 2-ethyl anthraquinhydrone per litre, grams | Maximum $H_2O_2$ concentration extracted (grams per litre) |
|---|---|---|---|---|
| 99% cyclohexanol propionate | 65 | 17 | 53 | 265 |
| Do | 50 | 58 | 42 | 290 |
| 96% methyl cyclohexanol acetate | 70 | | 68 | 240 |
| Do | 60 | 23 | 57 | 235 |
| Do | 50 | 54 | 46 | 345 |

The properties of the solvent mixture may also be varied by altering the ester content of the ester component by the addition of the cyclohexanol. This method suffers from the disadvantage that the solvent concentration in the extracted hydrogen peroxide is increased owing to the greater solubility of the cyclohexanol, although the concentration is much below that obtained when the pure cyclohexanol is used. The following examples illustrate this effect. Methyl cyclohexanol acetate with varying added proportions of the cyclohexanol, mixed with an equal volume of benzene, is used as the solvent mixture.

*As above, but initially containing 100 gm./litre of 2-ethyl anthraquinone*

| Ester content of ester component, percent | Concentration of 2-ethyl anthraquinone per litre, grams | Concentration of 2-ethyl anthraquinhydrone per litre, grams | Maximum $H_2O_2$ concentration extracted (grams per litre) |
|---|---|---|---|
| 96.5 | 48.5 | 51.5 | 370 |
| 93.0 | 45.5 | 54.5 | 300 |
| 90.0 | 38.5 | 61.5 | 270 |

EXAMPLE 2

The solubility of 2-ethyl anthraquinone in a mixture of equal volumes of methyl cyclohexanol acetate (97.5% ester content) and I. Benzene with a flash point of 12° F.
II. A methyl substituted benzene with a boiling range of 5% at 155° C. and 95% at 185° C. and a flash point of 105° F.
III. A methyl substituted benzene as above but with a flash point of 125° F.

at 25° C. is greater than 80 gms./litre in each of the solvent mixtures. This shows that the solubility of the anthraquinone is not excessively reduced by replacing benzene by these substituted benzenes.

Solutions of 2-ethyl anthraquinone were made in the solvent mixtures described above. The dissolved 2-ethyl anthraquinone was then hydrogenated with hydrogen in the presence of a palladium catalyst supported on activated alumina. The hydrogenation process was continued until 2-ethyl anthraquinone was completely converted to 2-ethyl anthraquinol. After standing for 24 hours at 25° C. the catalyst and the precipitated anthraquinol were filtered from all three solutions and the concentraion of anthraquinol remaining in solution in each mixture was determined. The results were as follows:

| Solvent mixture | Solubility of 2-ethyl anthraquinol (gms./litre) | Solubility of 2-ethyl anthraquinol as the equivalent hydrogen peroxide (gms./litre) |
|---|---|---|
| I | 15.4 | 2.20 |
| II | 15.8 | 2.26 |
| III | 15.5 | 2.21 |

The above results show that the replacement of benzene by the substituted benzene did not reduce the solubility of the 2-ethyl anthraquinol.

Solutions containing 100 gms./litre of 2-ethyl anthraquinone in the solvent mixtures I and II described above were hydrogenated in the presence of a palladium catalyst supported on activated alumina until a precipitate of 2-ethyl anthraquinhydrone was just formed. After standing for 24 hours at 25° C. the precipitate and catalyst were filtered off and the concentration of the 2-ethyl anthraquinhydrone remaining in the solvent mixture was determined. The results were as follows:

| Solvent | Concentration of 2-ethyl anthraquinhydrone (gms./litre) | Concentration of 2-ethyl anthraquinhydrone as equivalent hydrogen peroxide (gms./litre) |
|---|---|---|
| I | 45.5 | 3.3 |
| II | 45.5 | 3.3 |

The above results show that the replacement of the benzene by a substituted benzene does not affect the solubility of the 2-ethyl anthraquinhydrone.

Portions of the solvent mixtures I, II and III described above were shaken with an equal volume of 15% aqueous hydrogen peroxide at 25° C. until equilibrium was reached. The two phases were then separated and the hydrogen peroxide concentration in each determined. The partition coefficient of hydrogen peroxide between the two phases was then calculated by dividing the concentration in the aqueous phase by the concentration in the organic phase. Thus the results were as follows:

| Solvent mixture | Partition co-efficient |
|---|---|
| I | 95 |
| II | 119 |
| III | 119 |

The above results show that the partition coefficient and hence the maximum hydrogen peroxide concentration which is obtained by multiplying the partition coefficient by the quinhydrone solubility as the equivalent hydrogen peroxide, which may be extracted from solutions in the mixtures, is not adversely affected by replacing the benzene by the substituted benzene.

A solution of 70 gms./litre of 2-ethyl anthraquinone in solvent mixture II described above was passed through a hydrogenator, oxidiser and a counter-current water-filled plate column. The solution was passed through at such a rate that one complete cycle took about three hours. It was then returned to the hydrogenator. A catalyst, consisting of palladium supported on activated alumina, was used in the hydrogenator and this catalyst was continuously separated from the hydrogenated solution before the solution passed to the oxidiser. The concentration of hydrogen peroxide in the oxidised organic solution was 2.5 gms./litre and in the aqueous extract 70 gms./litre. The efficiency of extraction was greater than 95%.

EXAMPLE 3

The solubilities of 2-ethyl anthraquinone and of 2-ethyl anthraquinol were determined in a mixture of equal volumes of methyl cyclohexanol acetate (98% ester content) and of a commercial sulphur-free xylene, using the method described above.

The solubility of the quinone was found to be 104 gms./litre and of the quinol was 14.7 gms./litre, equivalent to 2.1 gms./litre of hydrogen peroxide.

The partition coefficient of hydrogen peroxide between water and the solvent mixture was also determined in the manner described above, and found to be 104.

These results show that benzene can be replaced by xylene in the solvent mixture without any unfavourable effects on its properties as a solvent. In addition, the flash points of the solvent mixture containing benzene and 100 gms./litre of 2-ethyl anthraquinone, and that containing xylene and 100 gms./litre of 2-ethyl anthraquinone, were determined and found to be less than 32° F. for the former and 96° F. for the latter. This is an indication of the reduction in the fire hazard following the substitution of benzene.

A solution containing 80 gms. of 2-ethyl anthraquinone in each litre of a mixture of equal volumes of the commercial sulphur-free xylene referred to above and of methyl cyclohexanol acetate, was passed through a hydrogenator, oxidiser and counter-current water-filled plate column, where the hydrogen peroxide formed was extracted; the extracted oganic solution was then recycled. A catalyst consisting of palladium on activated alumina was used in the hydrogenator, and was continuously separated from the hydrogenated solution before the solution was autoxidised. The mean concentration of 2-ethyl anthraquinhydrone in the hydrogenated solution was 41 gms./litre, equivalent to a hydrogen peroxide concentration of 2.9 gms./litre. The mean concentration of hydrogen peroxide in the aqueous extract was 147 gms./litre and the efficiency of extraction was 96%.

EXAMPLE 4

The solvent mixture II referred to above, containing 70 gms./litre of 2-ethyl anthraquinone, was used in a cycle as outlined in Example 2. In this case, the hydrogenation catalyst was palladium supported on magnesium hydroxide. The mean concentration of 2-ethyl anthraquinhydrone in the hydrogenated solution was 42.5 gms./litre, equivalent to 3.05 gms./litre of hydrogen peroxide. The mean concentration of hydrogen peroxide in the aqueous extract was 156 gms./litre, and the efficiency of extraction was over 99%.

EXAMPLE 5

The suitability of a solvent for use in the autoxidation process for the manufacture of hydrogen peroxide may be measured in part by determining, firstly, the solubility of the anthraquinone, secondly, the solubility of the reduced form of the anthraquinone, and, thirdly, the partition coefficient of hydrogen peroxide between water and the solvent. The values for these determinations indicate the volume of organic solution which has to be cycled through the plant to give a certain yield of hydrogen peroxide, and the maximum concentration of aqueous hydrogen peroxide which may be obtained from the cycle directly.

Thus, for example, in the case of methyl cyclohexanol acetate used in conjunction with 2-ethyl anthraquinone the use of methyl cyclohexanol acetate alone differs from the use of mixtures of the said ester with a hydrocarbon as a solvent because, in the single solvent, the quinone solubility is much closer to the equivalent quinol solubility than was the case with the solvent mixture. This means that reduction of a saturated solution of the quinone may be taken beyond the half-way stage (quinhydrone) without precipitation of the reduced compounds, so that the saturated reduced solution contains both quinhydrone and excess quinol, or the anthraquinone may be completely converted to the quinol. In the following table, the solubilities of the reduced form are shown as the equivalent hydrogen peroxide concentration in the solution, the species in solution being the quinol. Comparative results obtained for the solutions at 20° C. are as follows:

| | 96% Methyl cyclohexanol acetate. | 96% Methyl cyclohexanol acetate/ benzene (1:1). |
|---|---|---|
| Ester content of ester component, percent | 98 | 97 |
| (1) Solubility of 2-ethyl anthraquinone (gms. per litre) | 70 | 118 |
| (2) Solubility of reduced form of 2-ethyl anthraquinone (≡gms. per litre $H_2O_2$) | 7.3 | 2.2 |
| (3) Partition co-efficient of $H_2O_2$ between water and the solvent | 30 | 95 |
| Maximum concentration of $H_2O_2$ which may be extracted (≡$H_2O_2$ concentration×partition co-efficient) | 219 | 209 |

Notes on the above table:
 (1) The values quoted are for gms. per litre of solution.
 (2) Determinations of quinhydrone and quinol solubilities were carried out as described in Example 2 above.
 (3) Determined as described in Example 2 above using 15% aqueous hydrogen peroxide.

EXAMPLE 6

A solution was made up, containing 46.8 grams of 2-ethyl anthraquinone per litre of methyl cyclohexanol acetate. This solution was hydrogenated with hydrogen in the presence of a catalyst consisting of palladium supported on activated alumina, so that the catalyst was in free suspension in the hydrogenator. Hydrogenated solution was withdrawn through a filter and autoxidised by air blowing. When the anthraquinol formed during the hydrogenation stage was oxidised, it re-formed the anthraquinone with the simultaneous formation of hydrogen peroxide. The oxidised solution was then passed through a conventional plate extraction column, counter-current to a stream of water, so that the hydrogen peroxide was extracted into the aqueous phase. The extracted organic solution was then returned to the hydrogenator and recycled.

The total volume of solution in the system was 80 litres, the volume of solution in the hydrogenator was 10 litres, and the rate of circulation of the organic solution was 0.3 litres per minute. During the hydrogenation stage, 67.5% of the quinone was converted to quinol, and the mean concentration as grams per litre of equivalent hydrogen peroxide was 4.41. During the oxidation stage, the average conversion of quinol to hydrogen peroxide was 97%, and the hydrogen peroxide was extracted as an aqueous solution containing 10.95% of hydrogen peroxide, with an overall extraction efficiency of 91%.

I claim:

1. In a cyclic process for the manufacture of hydrogen peroxide by the autoxidation of an anthraquinone derivative selected from the group consisting of substituted anthraquinhydrones and substituted anthraquinols in a solvent to form hydrogen peroxide and a substituted anthraquinone with the subsequent removal of the hydrogen peroxide by extraction with an aqueous liquid followed by reduction of the substituted anthraquinone back to said substituted anthraquinhydrone or substituted anthraquinol which is again autoxidised, the step of using a solvent containing as a first component for dissolving said anthraquinhydrones and anthraquinols an aliphatic ester selected from the group consisting of acetates and propionates of cyclohexanol and of methyl cyclohexanol and a second component for dissolving said anthraquinones.

2. A process as claimed in claim 1 wherein said aliphatic ester is methyl cyclohexanol acetate.

3. A process as claimed in claim 1 wherein said aliphatic ester is cyclohexanol acetate.

4. A process as claimed in claim 1 wherein said aliphatic ester is cyclohexanol propionate.

5. A process as claimed in claim 1 wherein said second component for dissolving said anthraquinone is selected from the group consisting of benzene and alkyl substituted benzenes.

6. A process as claimed in claim 5 wherein said second component is benzene.

7. A process as claimed in claim 5 wherein said second component is trimethyl benzene.

8. A process as claimed in claim 5 wherein said second component is xylene.

9. In a cyclic process for the manufacture of hydrogen peroxide by the autoxidation of an anthraquinone derivative selected from the group consisting of substituted anthraquinhydrones and substituted anthraquinols in a solvent mixture to form hydrogen peroxide and a substituted anthraquinone with the subsequent removal of the hydrogen peroxide by extraction with an aqueous liquid followed by reduction of the substituted anthraquinone back to said substituted anthraquinhydrone or substituted anthraquinol which is again autoxidised, the step of using in said solvent mixture as a component for dissolving said substituted anthtraquinhydrones and said substituted anthraquinols an aliphatic ester selected from the group consisting of acetates and propionates of cyclohexanol and of methyl cyclohexanol.

10. A process as claimed in claim 9 wherein said aliphatic ester is methyl cyclohexanol acetate.

References Cited in the file of this patent

UNITED STATES PATENTS

| | | |
|---|---|---|
| 2,158,525 | Riedl et al. | May 16, 1939 |
| 2,215,883 | Riedl et al. | Sept. 24, 1940 |
| 2,455,238 | Dawsey | Nov. 30, 1948 |
| 2,660,580 | Von | Nov. 24, 1953 |

FOREIGN PATENTS

| | | |
|---|---|---|
| 519,509 | Belgium | May 15, 1953 |